US010641973B2

(12) United States Patent
Shenai et al.

(10) Patent No.: US 10,641,973 B2
(45) Date of Patent: May 5, 2020

(54) CONNECTOR TRACING (71) Applicant: Dell Products L.P., Round Rock, TX (US)

(72) Inventors: Gurudath Harikrishna Shenai, Karnataka (IN); Praveen S. Lalgoudar, Bangalore (IN); Saujanya Golwelkar, Bangalore (IN); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/963,557

(22) Filed: Apr. 26, 2018

(65) Prior Publication Data

US 2019/0331864 A1     Oct. 31, 2019

(51) Int. Cl.
G02B 6/38        (2006.01)
F21V 8/00        (2006.01)

(52) U.S. Cl.
CPC .......... *G02B 6/3895* (2013.01); *G02B 6/001* (2013.01); *G02B 6/3893* (2013.01)

(58) Field of Classification Search
CPC .............................. G02B 6/3895; G02B 6/001
USPC ................................................... 385/15, 38
See application file for complete search history.

(56) References Cited

U.S. PATENT DOCUMENTS

| | | | | |
|---|---|---|---|---|
| 6,456,768 B1* | 9/2002 | Boncek | ................ | G02B 6/3817 385/100 |
| 8,554,033 B2* | 10/2013 | Kewitsch | ............. | G02B 6/3895 340/505 |
| 10,185,111 B2* | 1/2019 | Bauco | .................. | G02B 6/3893 |
| 2007/0154132 A1* | 7/2007 | Mates | .................. | D03D 1/0082 385/14 |
| 2011/0034068 A1* | 2/2011 | Russell | ................ | G02B 6/3895 439/488 |
| 2013/0209045 A1* | 8/2013 | Dean, Jr. | ............ | G02B 6/02033 385/113 |
| 2015/0043875 A1* | 2/2015 | Bookbinder | ......... | G02B 6/4482 385/100 |
| 2017/0123167 A1* | 5/2017 | Isenhour | ............... | G02B 6/0008 |
| 2017/0207585 A1* | 7/2017 | Butler | ................. | H01R 13/7172 |
| 2018/0172925 A1* | 6/2018 | Bauco | ..................... | G02B 6/447 |
| 2018/0172942 A1* | 6/2018 | Bauco | ..................... | G02B 6/3873 |
| 2018/0203195 A1* | 7/2018 | Chen | .................... | H04R 1/1033 |
| 2018/0210126 A1* | 7/2018 | Bauco | .................. | G02B 6/0006 |
| 2019/0174206 A1* | 6/2019 | Anolik | ............... | H01R 13/6683 |

* cited by examiner

Primary Examiner — Robert Tavlykaev
(74) Attorney, Agent, or Firm — Haynes and Boone, LLP (57) ABSTRACT According to one embodiment, a system includes a signaling connector comprising one or more wires. Each wire is capable of transmitting signaling between first and second components of an information handling system. A light-pipe is provided with the signaling connector. The light-pipe is capable of conveying light from one end of the signaling connector to another end of signaling connector so that the signaling connector can be traced.

20 Claims, 7 Drawing Sheets

CONNECTOR TRACING

BACKGROUND

The present disclosure relates generally to information handling systems, and more particularly, to connector tracing.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various hardware components of information handling systems are connected in order to provide or allow for the transfer or communication of signals from one component to another. These connections can be made through the use of various wiring, lines, cables, or connectors (either electrical or fiber optic) that are not always easy to trace.

Accordingly, it would be advantageous to have efficient and reliable mechanisms for tracing the connectors in an information handling system.

SUMMARY

According to one embodiment, a system includes a signaling connector comprising one or more wires. Each wire is capable of transmitting signaling between first and second components of an information handling system. A light-pipe is provided with the signaling connector. The light-pipe is capable of conveying light from one end of the signaling connector to another end of signaling connector so that the signaling connector can be traced.

According to another embodiment, an information handling system includes a first component and a second component. A signaling connector is capable of transmitting signaling between the first component and the second component. A light-pipe is provided with the signaling connector. The light-pipe is capable of conveying light from one end of the signaling connector to another end of signaling connector so that the signaling connector can be traced.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In the following description specific details are set forth describing certain embodiments. It will be apparent to one skilled in the art, however, that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU), graphics processing unit (GPU), or other hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Additionally, some embodiments of an IHS include non-transient, machine-readable media that include executable code that when run by a processor, may cause the processor to perform various steps or tasks. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 1:
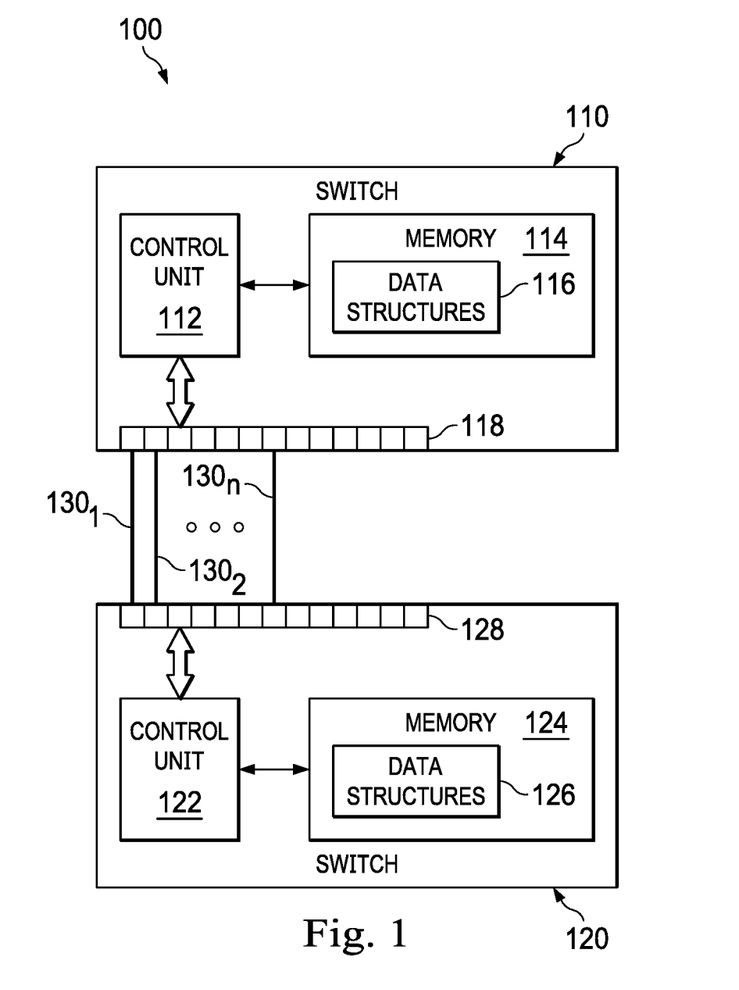
FIG. 1 shows a simplified diagram of a network, in accordance with certain embodiments.

FIG. 1 shows a simplified diagram of a network 100 according to some embodiments. Network 100 can be part of an IHS, or incorporate an IHS. As shown in FIG. 1, network 100 may include network switching devices or switches 110 and 120. Although only two switches are shown in FIG. 1, it would be understood that network 100 may include any number of switches. As shown, switches 110 and 120 respectively include a control unit 112 and 122 and a memory 114 and 124. Control unit 112 is coupled to memory 114 and may control the operation of switch 110, and control unit 122 is coupled to memory 124 and may control the operation of switch 120. In some examples, the control units 112 and 122 may be used to make forwarding decisions for network traffic being handled by switches 110 and 120, respectively, as well as to handle other management responsibilities for switches 110 and 120, respectively. In some examples, the control units 112 and 122 may each include one or more central processing units, processors, microprocessors, microcontroller, application specific integrated circuits (ASICs), field programmable gate arrays (FPGAs), and/or the like.

Memories 114 and 124 are each used to store one or more data structures 116 and 126, respectively. Control units 112 and 122 may maintain and/or update the one or more data structures 116 and 126, respectively. In some examples, the one or more data structures 116 and/or 126 may include virtual LAN (VLAN) tables, media access control (MAC) tables, layer 3 (L3) tables, layer 3 forwarding information bases, access control lists (ACLs), flow processing (FP) tables, and/or the like. In some examples, the one or more data structures 116 and/or 126 may be updated based on flow control messages received from a network controller, such as a software defined networking (SDN) controller or Open-Flow controller coupled to the switches 110 and/or 120. The memories 114 and 124 may each include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Switch 110 further includes one or more ports 118 for coupling switch 110 to other switches and/or network devices using network links. Similarly, switch 120 further includes one or more ports 128 (e.g., network interface controller (NIC) port) for coupling switch 120 to other switches and/or network devices using network links. In some examples, the control units 112 and 122 may use one or more protocols to communicate with the other switches and network devices. As shown in FIG. 1, switches 110 and 120 are coupled to each other using one or more network links $130_1$-$130_n$ to form a network segment of a larger network of which switches 110 and 120 belong. Each of the network links $130_1$-$130_n$ couple one of the ports 118 to one of the ports 128. Network traffic between switches 110 and 120 may use any of the network links $130_1$-$130_n$. In some examples, a hashing strategy may be used to select which of the network links $130_1$-$130_n$ on which to route a network packet between switches 110 and 120. In some examples, the network links $130_1$-$130_n$ may belong to a link aggregation group (LAG).

An IHS, e.g., incorporated within or including a network 100, may include one or more circuit boards operable to mechanically support and electrically couple electronic components making up the information handling system. For example, circuit boards may be used as part of motherboards, memories, storage devices, storage device controllers, peripherals, peripheral cards, network interface cards, and/or other electronic components. As used herein, the term "circuit board" includes printed circuit boards (PCBs), printed wiring boards (PWBs), etched wiring boards, and/or any other board or similar physical structure operable to mechanically support and electrically couple electronic components. The circuit board is configured to provide structural support for one or more information handling resources of IHS and/or electrically couple one or more of such information handling resources to each other and/or to other electric or electronic components external to the IHS.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system. Each of the components, devices, or apparatuses of the IHS can be a "network device."

To couple the various network devices in an IHS, e.g., incorporated within or including a network 100 as shown in FIG. 1, connectors may be used. In some embodiments, for example, the connectors can be wiring, lines, cables, or other such connectors (electrically conductive or fiber optic), each of which can provide for transfer of one or more signals to communicate data, information, etc. between components of an IHS, either by electrical or optical signaling.

As information handling systems become increasingly more complex—involving more components, distributed over many locations and sites—management of the connectors becomes a critical requirement for proper functioning and maintenance of such deployments. This is especially true when equipment or components at one or more sites or locations are replaced, reconfigured, or supplemented to add capacity and bandwidth, and/or to upgrade the information handling system.

With tens, hundreds, or potentially thousands of cables or connectors used in a deployment, it is becoming increasingly challenging to keep track of what connectors correspond to what components, for example, in a wiring closet housing some portion of the connectors or cables. Conventional techniques for cable or connector maintenance include cable tags and cable color code. With respect to the former, during installation, each cable is tagged using paper/electronic tags that may include information, for example, for source-port, destination-port, etc. Concerning the latter, the cables are color-coded so as to differentiate between them, for example, up-link cables versus down-link cables.

Continuous, ad-hoc reconfiguration or maintenance of an information handling system, including one or more wiring closets for the same, renders these conventional techniques impractical. The maintenance crew thus falls back to less optimal solutions, such as tracing the cables through conduits and cable trays to identify or trace connectors. There is a need for a technique that can identify the end-points of a plugged or unplugged connector or cable without having to trace the cable through conduits and/or cable trays.

For IHS deployments involving many network devices coupled by many connectors (e.g., implementing network links), or where many connectors are used for even a fewer number of network devices (e.g., switches, routers, bridges, and/or the like), it can be challenging to keep track of which connectors (electrical or fiber optic) relate to which network devices, or ports of a network device, thus making it difficult to reconfigure, supplement, or otherwise maintain the IHS deployment.

Figure 2:
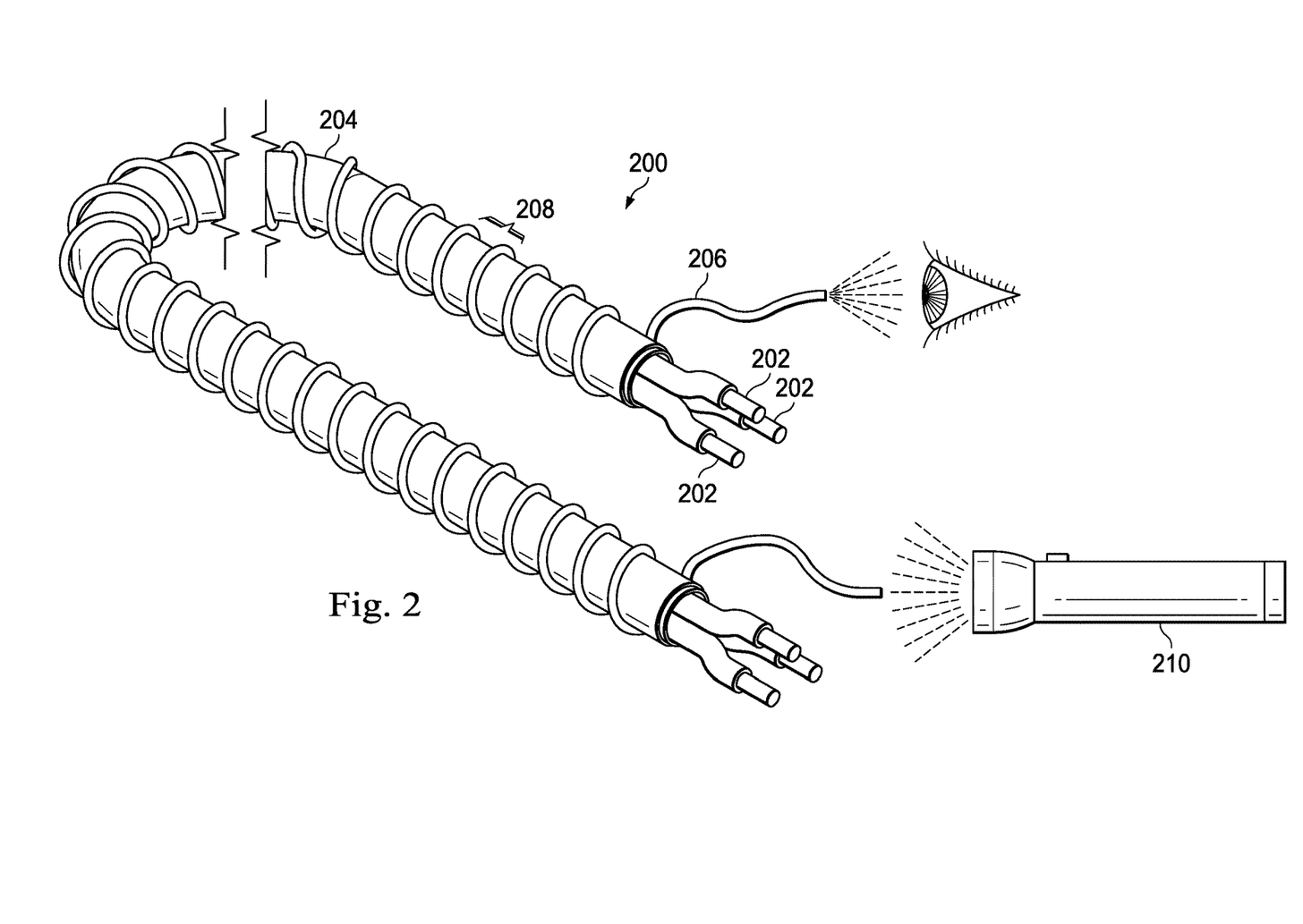
FIG. 2 illustrates a system for tracing a connector, in accordance with certain embodiments.
Figure 3:
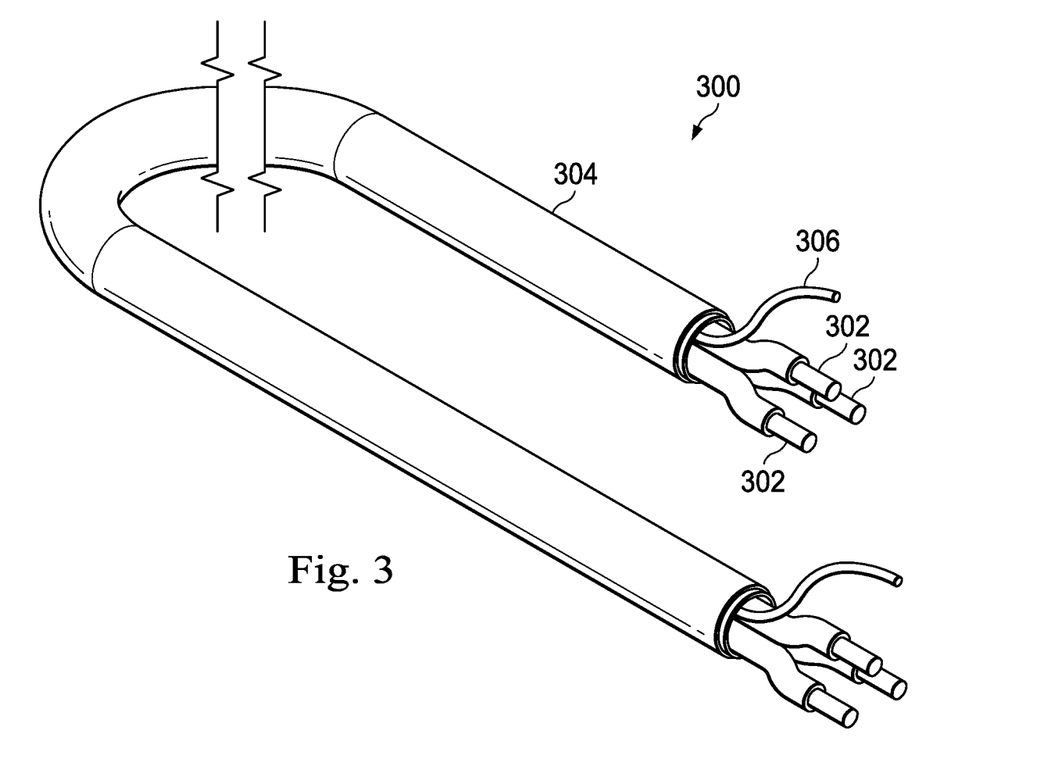
FIG. 3 illustrates a system for tracing a connector, in accordance with certain embodiments.

According to certain embodiments, these concerns of conventional connectors may be addressed by using a cable design that incorporates an emitting light-pipe running the length of the cable, as shown, for example in FIGS. 2 and 3.

FIG. 2 illustrates a system 200 for tracing a signaling connector, in accordance with embodiments. In some embodiments, system 200 includes one or more electrically conductive wires 202, that may be formed of any suitable electrically conductive material, such as, for example, copper, gold, aluminum, etc. In some embodiments, system 200 may include optical fiber. Wires 202 may be covered with a jacket or coating 204, that both protects and insulates wires 202. Jacket or coating 204 can be formed of plastic, vinyl, rubber, PVC, PE, PUR, TPR, TPE, CPE, etc. In various embodiments, the wires 202 and jacket 204 can implement any one of different standard or well-known cable configurations, such as, for example, an RJ45, RS232, DAC connector cable, etc.

A light-pipe 206 is coiled or spiral-wrapped around jacket 204. In some embodiments, the light-pipe 206 itself is covered or coated with its own jacket, which can be formed of the same or different material as used for jacket 204. In some embodiments, the jacket is transparent or translucent. In other embodiments, the light-pipe 206 is uncovered, but formed of a material, thickness, or shape that is suitably durable for routing needs of the system or network (e.g., IHS) in which it is deployed.

Light-pipe 206 is formed of a material capable of carrying or conveying light. The light-conveying properties of the material need not be of such quality (or expense) as necessary for transmission of optical signals (e.g., such as fiber-optic), which are impacted or affected by attenuation and dispersion. Attenuation, also known as transmission loss, is the reduction in intensity of the light beam as it travels through the transmission medium. Scattering and selective absorption are the two main reasons for attenuation in optical fiber. Dispersion is a phenomenon in which the phase velocity of a wave is dependent on its frequency. Three types of dispersion that affect fiber optics are: (1) modal dispersion, (2) chromatic dispersion, (3) polarization mode dispersion. Dispersion limits the available bandwidth in fiber optics as well as distance over which the signal can be sent without errors. Modal dispersion is a distortion in which the signal is spread in time because the propagation velocity of the optical signal is not the same for all modes. Chromatic dispersion occurs when the light source produce a range of wavelengths and each propagate at different speeds.

Because the light that is being transmitted through the light-pipe 206 is not used for high-speed data transmission, the concerns associated with light attenuation and dispersion in fiber-optics are less relevant to these embodiments. The light conveyed by light-pipe 206 is being used as a visual indicator of the associated signaling connector, and hence is less impacted by these factors. For various embodiments, it is sufficient that the light-pipe material be such that a light source 210 coupled or at one end of the light-pipe 206 is visible to the human eye at the other end of the light-pipe 206. Lack of the stringent requirements necessary for fiber-optic allows light-pipe 206 to be implemented or constructed with less expensive material, such as, for example, inexpensive plastic or fiber-glass. In side emitting light-pipes, light is emitted out of the light-pipe 206 via tiny orifices, thus making light visible along the entire length of the light-pipe 206.

In some embodiments, light-pipe 206 is implemented as 1-2 mm inexpensive plastic light-pipe wrapped spirally around, e.g., a RJ45 cable, with 6 to 12 inch gap between each crest-to-crest spiral turn 208. This distance can further be optimized based on the total length of the signaling cable. This will allow using the least amount of material required for light-pipe 206, thus keeping cost of manufacturing reasonable.

FIG. 3 illustrates a system 300 for tracing a signaling connector, in accordance with embodiments of the present disclosure. Like system 200, system 300 comprises one or more electrically conductive wires 302, that may be formed of any suitable electrically conductive material, such as, for example, copper, gold, aluminum, etc., or optical fibers. And wires 302 may be covered with a jacket or coating 304, that both protects and insulates wires 302. Jacket or coating 304 can be formed of plastic, vinyl, rubber, PVC, PE, PUR, TPR, TPE, CPE, etc. A light-pipe 306—formed of a material capable of carrying or conveying light, such as, for example, inexpensive plastic or fiber-glass—runs parallel with wires 302 and is embedded, incorporated into, or also surrounded by jacket 304. In some embodiments, the jacket 304 may be formed of a material that is transparent or translucent.

In operation, the systems 200 and 300 shown in FIGS. 2 and 3, are deployed for connecting various components or devices in, for example, an IHS. When the IHS is being deployed, implemented, set-up, produced, repaired, maintained, upgraded, or otherwise modified, for example, by adding, swapping out, changing, replacing, or removing components, a maintenance operator, crew, or other personnel are able to readily identify the corresponding endpoints of each cable or connector, for example, by shining or providing a light source at one endpoint and looking for the other endpoint at which light should be emitting or visible. This allows the operator, crew, or other personnel to readily trace the various cables or wires in the IHS, without requiring tags, color-coding, and/or other schemes. In some embodiments, changes can be made to the cables, connectors, etc. of the IHS using systems 200 and 300, without taking the links offline.

In some embodiments, one or both ends of the wire, cable, or connector systems (e.g., systems 200 or 300) may be terminated with some suitable form of plug, such as, for example, an RJ11, RJ14, RJ25, or RJ45 connector plug. In some embodiments, a special cap may be provided on one or both plugs terminating the system 200 or 300.

Figure 4:
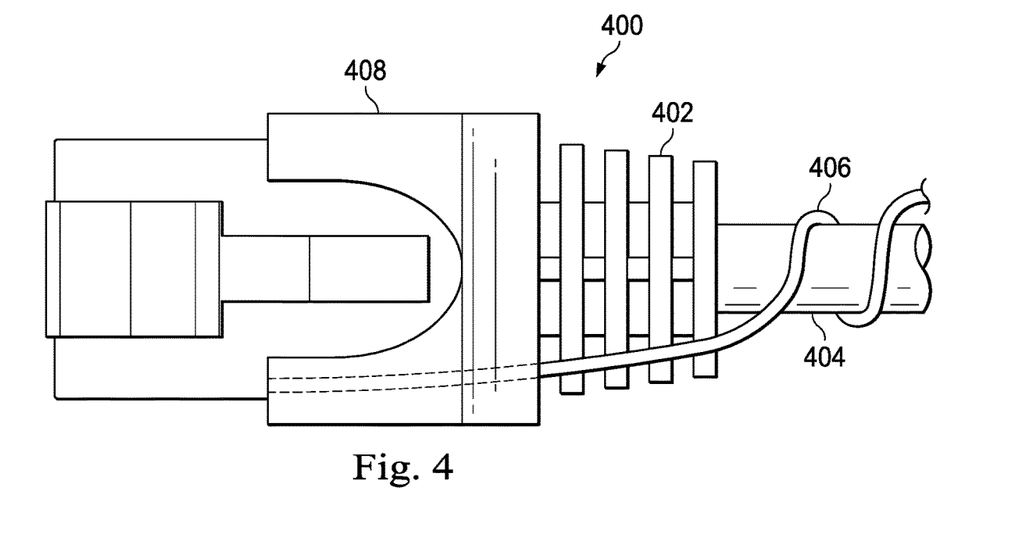
FIG. 4 illustrates a top view of a termination cap system used in conjunction with the connector tracing, in accordance with certain embodiments.

FIG. 4 illustrates a top view of a termination or boot cap system 400, in accordance with certain embodiments. Termination cap system 400 can be provided or incorporated into any of various, standard connector plugs, including for example, an RJ45 connector plug 402 as shown. Connector plug 402 terminates a signaling connector 404 (e.g., a wire, cable, either electrically conductive or fiber optic) that may provide for transfer of one or more signals to communicate data, information, etc. between components of an IHS. A connector tracing system 406 (e.g., including a light-pipe) is provided for facilitating the tracing of connector 404, as described herein. As shown, connector tracing system 406 can be implemented, for example, as system 300 described with reference to FIG. 3, but in other embodiments, system 406 can be implemented as system 200 described with reference to FIG. 2.

Figure 5:
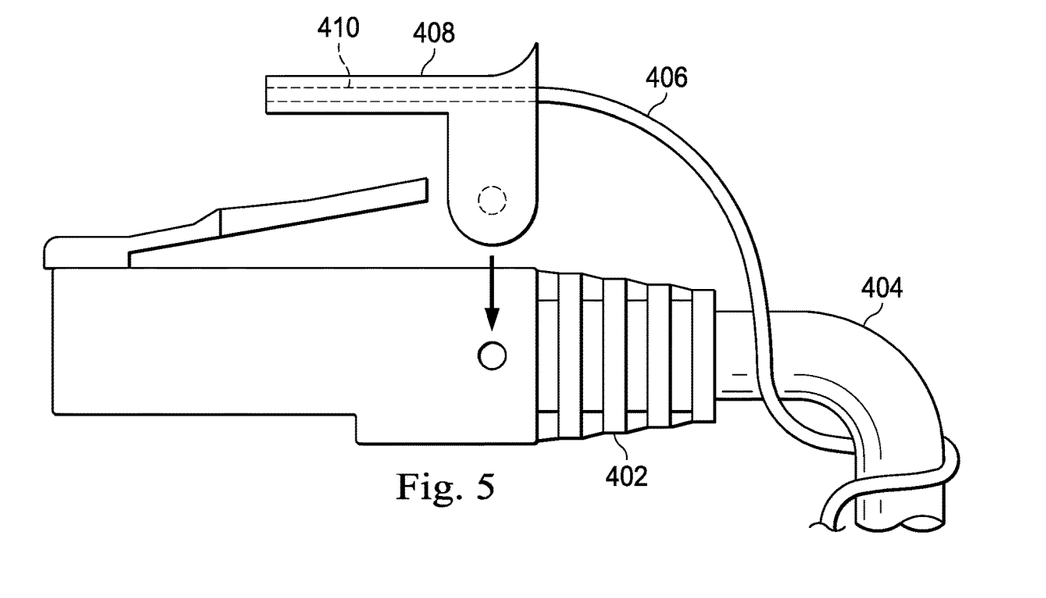
FIG. 5 illustrates a side view of the termination cap system used in conjunction with the connector tracing, in accordance with certain embodiments.
Figure 6:
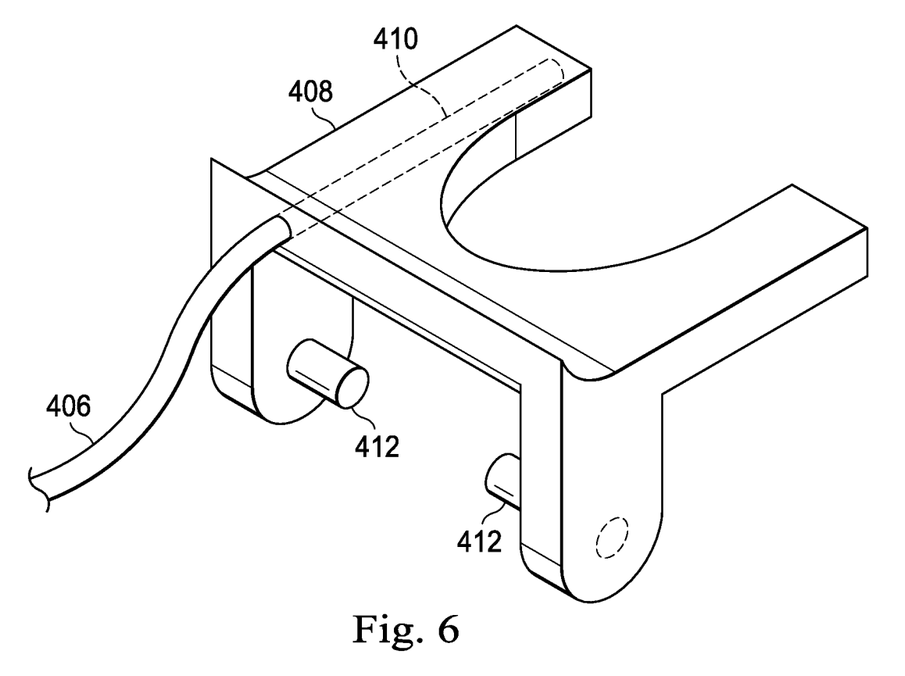
FIG. 6 illustrates an isometric view of termination cap, in accordance with certain embodiments.

Termination cap system 400 includes a boot cap 408. With reference to FIGS. 5 and 6, in some embodiments, boot cap 408 is movably attached to the connector plug 402, and may be used to facilitate the insertion or removal of the plug 402 into or out of a port on a component of a network—e.g., port 118 or 128 on a switch 110 or 120 as shown in FIG. 1. For example, in some embodiments, boot cap 408 is used to for press release of an RJ45 connector. For this, in some embodiments, boot cap 408 comprises pivot points 412 for hingedly attaching boot cap 408 to connector plug 402.

Boot cap 408 is attached to connector tracing system 406, and may provide for transmission or transfer of light from a light source (e.g., a link status light-emitting diode (LED) of a NIC port) on the hardware component to the connector tracing system 406. As shown in FIGS. 5 and 6, boot cap 408 includes or incorporates a termination end-point 410 for the connector tracing system 406. In some embodiments, termination end-point 410 can be implemented as a cavity formed in the boot cap 408 through which the light-pipe of connector tracing system 406 is passed. In some embodiments, termination end-point 410 can be implemented with light conveying material (e.g., plastic or fiberglass) formed into the boot cap 408 itself. The termination end-point 410 provides a point of termination for the light-pipe of connector tracing system 406 such that it can readily aligned to the link LED of the NIC port or switch port of the hardware component.

Figure 7A:
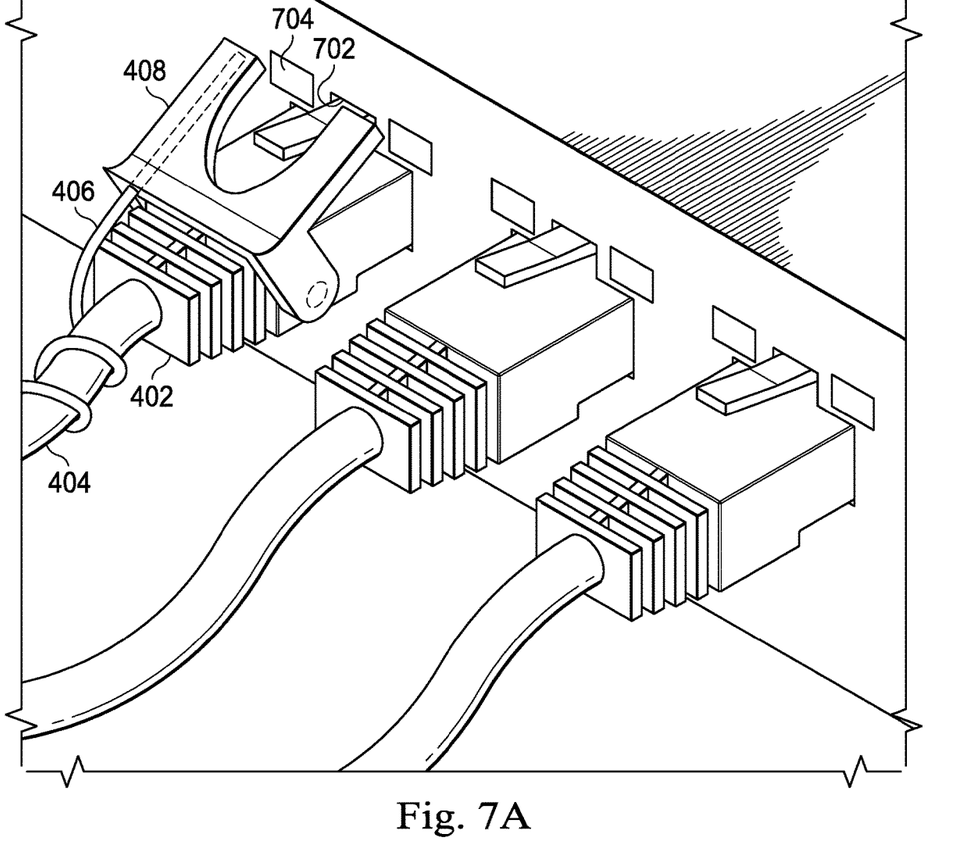
FIGS. 7A and 7B illustrate an example of operation for the termination cap system, in accordance with certain embodiments.
Figure 7B:
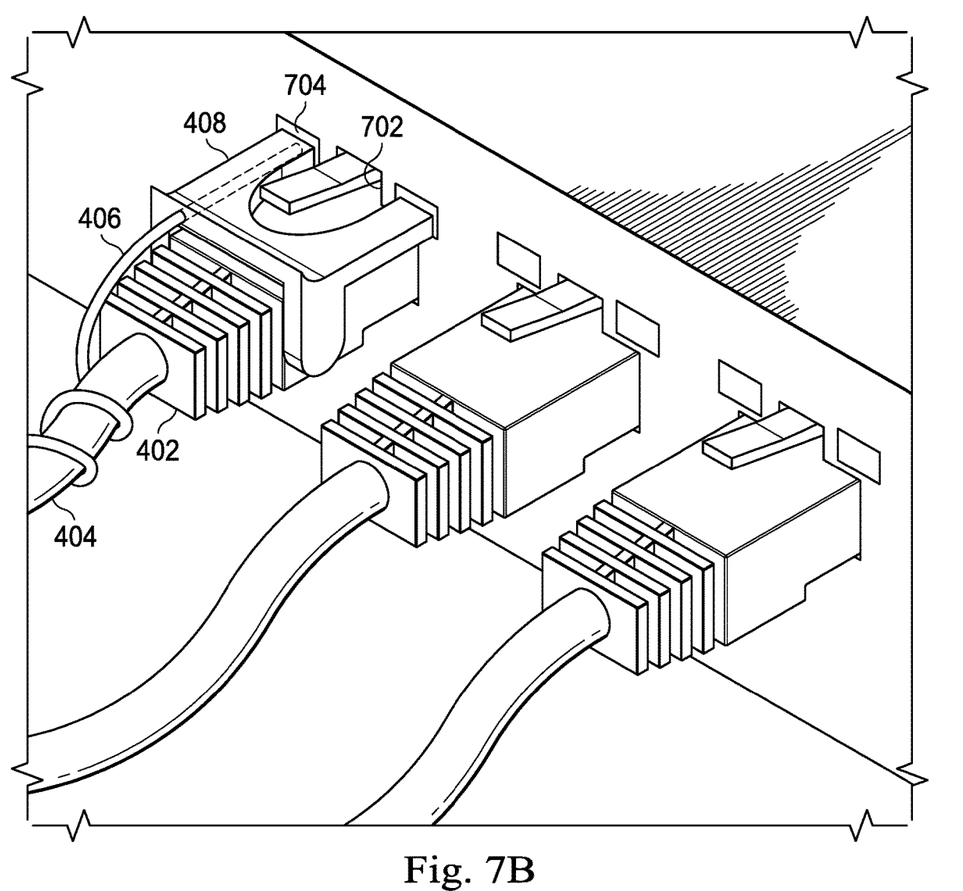

FIGS. 7A and 7B illustrate an example of operation for the termination cap system 400, in accordance with embodiments of the present disclosure. As shown in FIGS. 7A and 7B, connector 404 (e.g., cable) is plugged into a port 802 (e.g., NIC-port or switch port) of a hardware or network component using the boot cap system 400. Port 702 may include one or more light sources 704 (e.g., such as an LED). Such light sources 704 indicate activity over the respective link, i.e., providing a visual indication of traffic flowing through the given port 702.

In a first operating configuration, as shown in FIG. 7A, when the hardware component and those components to which it is connected are operating properly, termination cap system 400 and connector tracing system 406 are not needed to provide a trace for connector 404. Thus, the boot cap 408 is raised with respect to the plug 402 so that the termination end-point 410 is out of alignment with the link/activity light source 704, and as such, light is not conveyed or carried by the light-pipe of connector tracing system 406.

In a second operating configuration, as shown in FIG. 7B, when the hardware component or those components to which it is connected are not operating properly, or need to be supplemented, replaced, removed, and/or otherwise maintained, termination cap system 400 and connector tracing system 406 may be needed to provide a trace for connector 404. In this configuration, the boot cap 408 is lowered with respect to the plug 402 so that the termination end-point 410 is moved into alignment with the link/activity light source 704, and as such, light source 704 fills the light-pipe with light so that the connector 404 can be traced or identified at the other end of the system 406. Furthermore, by utilizing a side-emitting light-pipe, light dissipates through the openings of the light-pipe, thus lighting its entire length from to end-to-end, facilitating the tracing of connector 404.

Accordingly, in some embodiments, the techniques of the present invention utilize the availability of existing LEDs (e.g., light source 704 as shown in FIGS. 7A and 7B) on a hardware component as the light source for the light-pipe; no additional light source is required when the cable is plugged in. A typical 550 nanometer green LED light (that is used as an Activity LED) operates at 30-60 milliwatts (mW) of power and has a luminous efficacy of 90-100 lumens per watt (lm/watt). Such LED can potentially light up a light-pipe for up to 30 meters (or approximately 100 feet) of cable or conductor. This is of sufficient length to be effectively used in most wiring closets or even some data centers.

When a cable endpoint is not plugged into a NIC/Switch port, an external light source, such as a flash light, can be used to fill the light pipe of the connector tracing system 406. For the reasons described herein, there is no need for a coherent light source such as an expensive laser to be the light source for the connector tracing system. A non-coherent light source like a LED and/or a flash light can be coupled to the light-pipe when end-point detection is required for an unplugged cable.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
    a signaling connector that includes one or more wires that are each configured to transmit signaling between a first component and a second component that are included in an information handling system;
    a light-pipe provided with the signaling connector, wherein the light-pipe is configured to convey light from one end of the signaling connector to another end of signaling connector; and
    a termination cap that is configured to couple the signaling connector with the first component that is included in the information handling system, wherein the light-pipe is positioned on the termination cap such that, when the termination cap is coupled with the first component that is included in the information handling system, the light-pipe is located adjacent a light source on the first component that is included in the information handling system in order to allow light from the light source to be conveyed through the light-pipe.

2. The system of claim 1, wherein the light-pipe is spirally wound around the signaling connector.

3. The system of claim 1, wherein the signaling connector is covered by a jacket, and wherein the light-pipe is incorporated in the jacket of the signaling connector.

4. The system of claim 1, wherein the light-pipe is formed of fiberglass.

5. The system of claim 1, wherein the light-pipe is formed of plastic.

6. The system of claim 1, wherein the termination cap comprises:
 a plug for mating with a port in the first component of the information handling system, wherein the port is associated with the light source; and
 a boot cap movably attached to the plug for positioning of the light-pipe into or out of alignment with the light source.

7. The system of claim 6, wherein the boot cap is movably attached to the plug for positioning of the light-pipe into or out of alignment with the light source while the plug is mated with the port of the first component.

8. The system of claim 1, wherein the light source comprises a link light-emitting diode of the first component.

9. The system of claim 1, wherein the signaling connector is formed of electrically conductive material.

10. The system of claim 1, wherein the signaling connector is formed of fiber optic material.

11. An information handling system comprising:
 a first component and a second component;
 a signaling connector that is configured to transmit signaling between the first component and the second component;
 a light-pipe provided with the signaling connector, wherein the light-pipe is configured to convey light from one end of the signaling connector to another end of signaling connector; and
 a termination cap that is configured to couple the signaling connector with the first component, wherein the light-pipe is positioned on the termination cap such that, when the termination cap is coupled with the first component, the light-pipe is located adjacent a light source on the first component in a manner that provides light from the light source to be conveyed through the light-pipe.

12. The information handling system of claim 11, wherein the light-pipe is spirally wound around the signaling connector.

13. The information handling system of claim 11, wherein the signaling connector is covered by a jacket, and wherein the light-pipe is incorporated in the jacket of the signaling connector.

14. The information handling system of claim 11, wherein the light-pipe is formed of fiberglass.

15. The information handling system of claim 11, wherein the light-pipe is formed of plastic.

16. The information handling system of claim 11, wherein the termination cap comprises:
 a plug configured to mate with a port in the first component, wherein the port is associated with the light source; and
 a boot cap movably attached to the plug for positioning of the termination cap into or out of alignment with the light source.

17. The information handling system of claim 16, wherein the boot cap is movably attached to the plug for positioning of the light-pipe into or out of alignment with the light source while the plug is mated with the port of the first component.

18. The information handling system of claim 11, wherein the light source comprises a link light-emitting diode of the first component.

19. The information handling system of claim 11, wherein the signaling connector is formed of electrically conductive material.

20. The information handling system of claim 11, wherein the signaling connector is formed of fiber optic material.

* * * * *